(12) United States Patent
Chen et al.

(10) Patent No.: US 12,340,533 B2
(45) Date of Patent: Jun. 24, 2025

(54) THREE DIMENSIONAL TRAJECTORY MODEL AND SYSTEM

(71) Applicant: Infinity Cube Limited, Kowloon (HK)

(72) Inventors: Ernest Chen, Kowloon (HK); Victor Tan, Kowloon (HK)

(73) Assignee: Infinity Cube Limited, Kowloon (HK)

( * ) Notice: Subject to any disclaimer, the term of this patent is extended or adjusted under 35 U.S.C. 154(b) by 486 days.

(21) Appl. No.: 17/724,049

(22) Filed: Apr. 19, 2022

(65) Prior Publication Data

US 2023/0334689 A1   Oct. 19, 2023

(51) Int. Cl.
  *G06T 7/70* (2017.01)
  *G06F 17/13* (2006.01)

(52) U.S. Cl.
  CPC ............ *G06T 7/70* (2017.01); *G06F 17/13* (2013.01); *G06T 2207/10028* (2013.01); *G06T 2207/30241* (2013.01)

(58) Field of Classification Search
  CPC ............ G06T 7/70; G06T 2207/10028; G06T 2207/30241; G06T 7/292; G06T 2207/10016; G06T 2207/30224; G06F 17/13
  USPC .......................................................... 382/103
  See application file for complete search history.

(56) References Cited

U.S. PATENT DOCUMENTS

| | | | |
|---|---|---|---|
| 7,515,735 B2 | 4/2009 | Miyamori | |
| 7,590,286 B2 | 9/2009 | Miyamori | |
| 8,189,857 B2 | 5/2012 | Johnson et al. | |
| 8,300,935 B2 | 10/2012 | Distante et al. | |
| 9,036,864 B2 | 5/2015 | Johnson et al. | |
| 9,734,405 B2 | 8/2017 | Marty et al. | |
| 9,999,825 B2 | 6/2018 | Shachar et al. | |
| 10,467,478 B2 | 11/2019 | Chen et al. | |
| 11,048,943 B2 | 6/2021 | Chen et al. | |
| 2003/0033318 A1 | 2/2003 | Carlbom et al. | |
| 2007/0064975 A1 | 3/2007 | Takanohashi et al. | |
| 2008/0200287 A1 | 8/2008 | Marty et al. | |
| 2009/0067670 A1 | 3/2009 | Johnson et al. | |
| 2011/0106361 A1* | 5/2011 | Staempfle | B62D 15/0265 701/23 |
| 2011/0305369 A1 | 12/2011 | Bentley et al. | |
| 2012/0293548 A1 | 11/2012 | Perez et al. | |
| 2015/0018990 A1 | 1/2015 | Shachar et al. | |
| 2015/0294158 A1* | 10/2015 | Collins | G06V 20/52 382/103 |

(Continued)

FOREIGN PATENT DOCUMENTS

| | | |
|---|---|---|
| CN | 101815227 A | 8/2010 |
| WO | WO-2021/016902 A1 | 2/2021 |

OTHER PUBLICATIONS

International Search Report and Written Opinion issued in International Patent Application No. PCT/IB2023/053553, mailed Sep. 20, 2023 (Sep. 20, 2023). 12 pages.

(Continued)

*Primary Examiner* — Stephen P Coleman
(74) *Attorney, Agent, or Firm* — Mintz, Levin, Cohn, Ferris, Glovsky and Popeo, P.C.; F. Jason Far-hadian, Esq.

(57) ABSTRACT

Provided herein is a method for reconstructing a three-dimensional projectile trajectory for a projectile object using one or more image capture devices and a projectile trajectory model. Systems and computer program products using the method are also described.

15 Claims, 8 Drawing Sheets

The view from a device and the x, y coordinates captured. The set of orange and blue 'x' represent one path of trajectory to be sent to the host (56) References Cited

U.S. PATENT DOCUMENTS

| | | | |
|---|---|---|---|
| 2015/0382076 A1* | 12/2015 | Davisson | H04N 21/435 |
| | | | 725/62 |
| 2016/0212385 A1 | 7/2016 | Ginsberg et al. | |
| 2017/0238055 A1 | 8/2017 | Chang et al. | |
| 2019/0289172 A1* | 9/2019 | Bangs | H04N 13/296 |
| 2020/0298080 A1* | 9/2020 | Zhang | G06N 3/045 |
| 2021/0264141 A1 | 8/2021 | Chojnacki | |

OTHER PUBLICATIONS

Brezak, Misel et al. "Robust and accurate global vision system for real time tracking of multiple mobile robots" Robotics and Autonomous Systems. 56 (Year: 2008) 213-230.

International Search Report issued in International Patent Application No. PCT/IB2016/001885, mailed Apr. 19, 2017 (Apr. 19, 2017). 4 pages.

* cited by examiner

| x | y | t |
|---|---|---|
| 1,822.06 | 439.34 | 0 |
| 1,745.50 | 451.81 | 13 |
| 1,674.81 | 463.58 | 20 |
| 1,600.20 | 476.31 | 31 |
| 1,533.72 | 487.93 | 41 |
| 1,466.50 | 499.97 | 51 |
| 1,403.22 | 511.55 | 64 |
| 1,343.26 | 522.74 | 72 |
| 1,283.48 | 534.11 | 84 |
| 1,225.65 | 545.29 | 92 |
| 1,168.18 | 556.56 | 100 |
| 1,116.86 | 566.75 | 112 |
| 1,063.69 | 577.44 | 121 |
| 1,009.27 | 588.5 | 134 |
| 970.37 | 582.43 | 141 |
| 934.62 | 572.56 | 154 |
| 897.03 | 562.45 | 161 |
| 861.17 | 553.08 | 171 |
| 824.93 | 543.87 | 181 |
| 789.39 | 535.11 | 194 |
| 751.78 | 526.12 | 201 |
| 720.98 | 518.98 | 214 |
| 685.17 | 510.93 | 221 |
| 654.4 | 504.23 | 231 |
| 621.78 | 497.35 | 240 |
| 589.19 | 490.71 | 252 |
| 558.32 | 484.64 | 264 |
| 528.87 | 479.04 | 271 |
| 496.58 | 473.12 | 284 |
| 465.69 | 467.67 | 291 |
| 436.93 | 462.79 | 300 |
| 408.82 | 458.2 | 311 |
| 380.47 | 453.75 | 322 |
| 357.05 | 450.21 | 333 |
| 326.58 | 445.78 | 341 |

The view from a device and the x, y coordinates captured. The set of orange and blue 'x' represent one path of trajectory to be sent to the host

THREE DIMENSIONAL TRAJECTORY MODEL AND SYSTEM

STATEMENT OF RIGHTS

The subject matter disclosed in this application was conceived with government support under grant number PG/126/19 awarded by the Hong Kong Government.

TECHNICAL FIELD

The disclosed subject matter generally relates to projectile object trajectory reconstruction modeling, as well as the related computing platforms, systems and methods.

BACKGROUND

Accurate three dimensional (3D) modeling of projectile object trajectories typically requires multiple synchronized stationary image capture devices. The image capture devices are used to obtain projectile trajectory information and a model may be used to calculate the real path of the projectile. The 3D modeling of such trajectories typically requires significant computing power that is unavailable and not sustainable on battery-operated devices, such as mobile phones or other personal handheld devices. Systems and methods are needed to overcome the noted shortcomings among others.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, a computer-implemented method for reconstructing a three-dimensional projectile object trajectory for a projectile object using one or more image capture devices is provided. The method includes: capturing one or more videos of a projectile object trajectory for the projectile object, using the one or more image capture devices coupled to at least a first computing device, the first computing device communicatively connected to a second computing device over a communications network; transmitting the one or more videos to the second computing device over the communications network, wherein the one or more videos from the one or more image capture devices are sorted into one or more data groups and at least one solution for the one or more data groups is computed by the second computing device using a projectile trajectory model; and receiving the solution computed for the one or more data groups by the first computing device.

In accordance with some implementations of the disclosed subject matter, a computing device is provided. The computing device includes: an image capture device communicatively coupled to a programmable processor; a non-transient machine-readable medium storing instructions that, when executed by the programmable processor, cause the programmable processor to perform operations including: capturing, using the image capture device, one or more two-dimensional videos of a three-dimensional projectile object; calculating a data group based on the one or more two-dimensional videos; computing, using the programmable processor, a solution that is based on the data group, the solution corresponding to at least one characteristic of the three-dimensional projectile object; and displaying a visual representation of the three-dimensional projectile object and at least one trajectory for the projectile object based on the solution.

A data group may include raw data (e.g. x axis position, y axis position, time) for one trajectory captured. A computing device may capture one or more trajectories and the trajectories are sorted into different data groups, such that data from each trajectory is stored in a data group. From different image capture devices the same path or trajectory may be captured and grouped in the same data group. For example, if a second image capture device is looking at the same single trajectory (from a different view from a first image capture device), the path from the second image capture device is added to the same data group as the data from the first image capture device viewing the same trajectory.

Right before sending to the server, a data group will contain all the raw data points of the paths from the same actual trajectory from all the image capture devices. That raw data can include: x-axis position, v-axis position, and time data for the path as captured by the image capture device.

In accordance with some implementations of the disclosed subject matter, a computer program product including a non-transient, machine-readable medium storing instructions which, when executed by at least one programmable processor, cause the at least one programmable processor to perform operations. The operations include capturing one or more videos of a projectile object trajectory for a projectile object, using one or more image capture devices coupled to at least a first computing device, the first computing device communicatively connected to a second computing device over a communications network; transmitting the one or more videos to the second computing device over the communications network, wherein the one or more videos from the one or more image capture devices are sorted into one or more data groups, at least one solution for the one or more data groups being calculated using a projectile trajectory model; and receiving the solution computed for the one or more data groups.

In accordance with some implementations of the disclosed subject matter, a computer-implemented method of reconstructing a three-dimensional projectile object trajectory. The method includes receiving, at a remote computing device, one or more videos of a projectile object trajectory for a projectile object, the one or more videos being captured using one or more image capture devices coupled to a local computing device, the local computing device and the remote computing device being communicatively connected over a communications network; sorting the one or more videos from the one or more image capture devices into one or more data groups; computing at least one solution for the one or more data groups using a projectile trajectory model; and transmitting the solution computed for the one or more data groups to the local computing device over the communications network.

The one or more image capture devices may include one or more cameras or video recorders that are not synchronized with a universal clock. The one or more image capture devices may include one or more cameras or video recorders that are not synchronized to a universal clock and the first computing device may include a smartphone that includes the image capture device. The computing device may be at least one of a smartphone, a mobile phone, a laptop, a personal computer, or the like. The three-dimensional projectile object trajectory may include one or more of: a path of the projectile object, a derived speed of the projectile object, a position of the projectile object, the spin of the projectile object, the location of the projectile object, the size of the projectile object, and all derivatives of the above data. The capturing one or more videos of the projectile object trajectory may further include isolating a single projectile object of interest from a field of view including two or more projectile objects.

The projectile trajectory model may be implemented according to a function ($\ominus$,t) that returns three-dimensional coordinate of the projectile object at time t governed by the projectile trajectory model with an initial state $\ominus$. The initial state $\ominus$ may be a tuple (x, y, z, vx, vy, vy, wx, wy, wz) which denotes the coordinate, velocity and spin of the projectile object in a three-dimensional environment. A loss function $f$ of the projectile trajectory model may be defined by the function ($\ominus$,t) as:

$$\min_{\theta,\tau} \sum_i \sum_j d(P_i \cdot f(\theta, t_{ij} + \tau_i), x_{ij}^t)$$

wherein $x_{ij}^t$ denotes a sample trajectory object J observed by at least one of the one or more image capture devices i at time t and Pi is the projection matrix for the capture device i and τi represents the time lag of the capture device i, and the function d measures distances between two homogeneous points on the capture device i frame. The function d may return the Euclidean distance between the two homogeneous points. The function ($\ominus$,t) may be used to calculate coordinates of the projectile object y(t) at time t with the initial state $\ominus$ by solving the following system of differential equations:

$$F_{drag} = -\frac{1}{2} C_d A \rho \left|\frac{dy}{dt}\right| \frac{dy}{dt}$$

$$F_{lift} = \frac{1}{2} L_e A \rho r \left|\frac{dy}{dt}\right| |\omega| \frac{\frac{dy}{dt} \times \omega}{\left|\frac{dy}{dt} \times \omega\right|}$$

$$T_{aero} = -T_e r |F_{lift}| \frac{\omega}{|\omega|}$$

$$I = \frac{2}{3} m r^2$$

$$\frac{d^2 y}{dt^2} = \frac{F_{lift}}{m} + \frac{F_{drag}}{m} + \frac{g}{m}$$

$$\frac{d\omega}{dt} = \frac{T_{aero}}{I}$$

where:
$C_d$=Drag coefficient
$L_e$; =Lift coefficient
$T_c$=Aerodynamic torque
$\rho$=Air density
A=Projectile cross section area
r=Radius of ball projectile
m=Mass of ball projectile
g=gravity acceleration Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
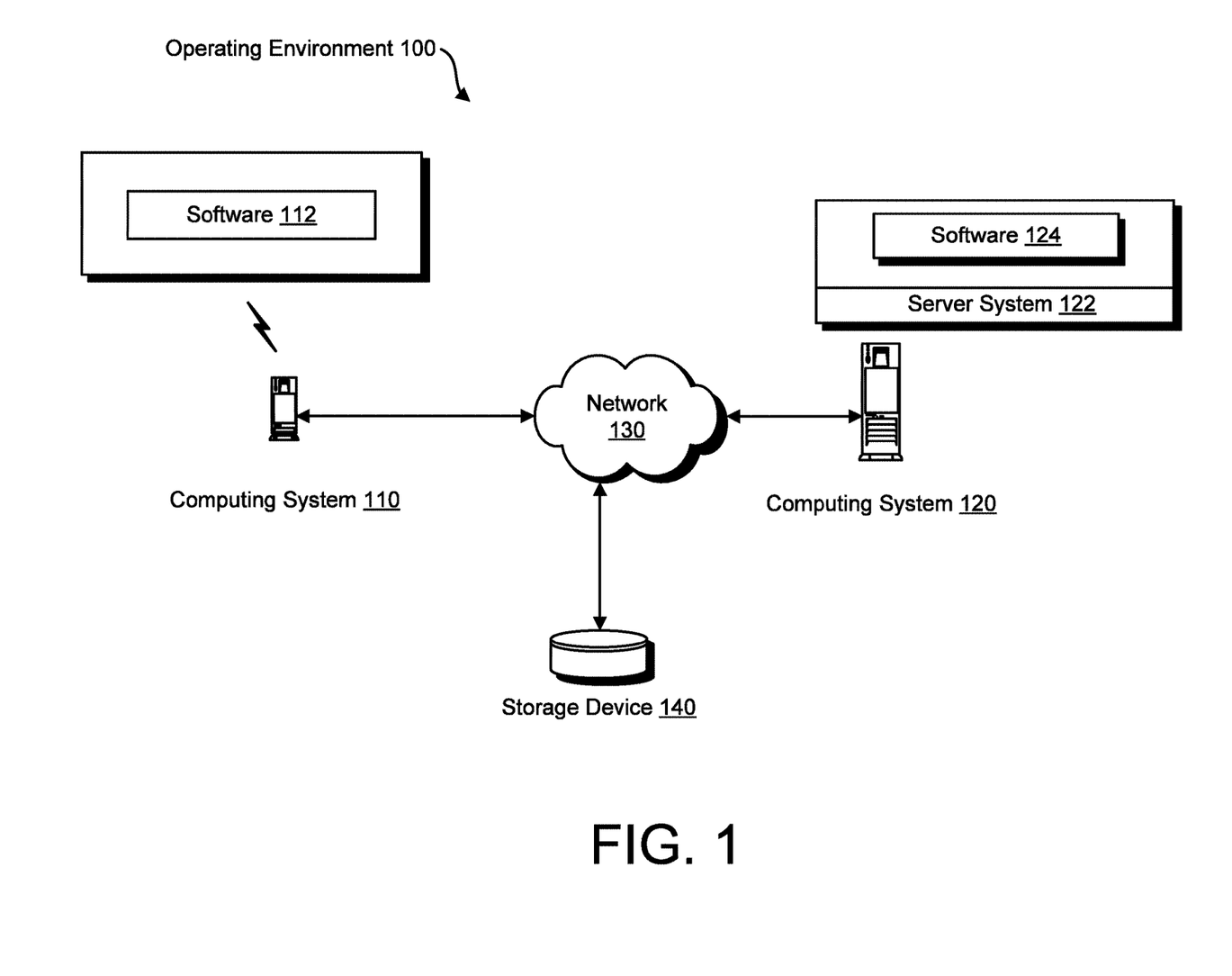
FIG. 1 illustrates an example operating environment for implementing a 3D trajectory reconstruction process in accordance with one or more embodiments.

Referring to FIG. 1, an example operating environment 100 is illustrated in which a computing system 110 may be used by a user to interact with software 112 being executed on computing system 110. The computing system 110 may be a general purpose computer, a handheld mobile device (e.g., a smart phone, mobile phone, or the like), a tablet (e.g., an Apple iPad®, Samsung® Galaxy Tab, or the like), or other communication capable computing device. Software 112 may be a web browser, a dedicated app or other type of software application running either fully or partially on computing system 110.

Computing system 110 may communicate over a network 130 to access data stored on storage device 140 or to access services provided by a computing system 120. Depending on implementation, storage device 140 may be local to, remote to, or embedded in one or more of computing systems 110 or 120. A server system 122 may be configured on computing system 120 to service one or more requests submitted by computing system 110 or software 112 (e.g., client systems) via network 130. Network 130 may be implemented over a local or wide area network (e.g., the Internet). In some implementations, functionalities associated with the storage device 140 and server system 122 may be performed by computing system 110 such that no communication over a network 130 is required.

Computing system 120 and server system 122 may be implemented over a centralized or distributed (e.g., cloud-based) computing environment as dedicated resources or may be configured as virtual machines that define shared processing or storage resources. Execution, implementation or instantiation of software 124, or the related features and components (e.g., software objects), over server system 122 may also define a special purpose machine that provides remotely situated client systems, such as computing system 110 or software 112, with access to a variety of data and services as provided below.

In accordance with one or more implementations, the provided services by the special purpose machine or software 124 may include providing a user, using computing system 110 or software 112, with the capability to access, invoke, instantiate, or execute a 3D projectile object trajectory reconstruction process or system. The related features as described herein can be implemented as a mobile application or any distributed computer program (e.g., "app" or "application"). As used herein, the term "mobile device" can include, for example, a mobile telephone, a smartphone, a tablet computer, a laptop computer, or similar such devices that incorporates with or connect to a image capture device. Also, image capture devices can be integrated into the mobile devices, or can be stand-alone image capture devices located about a physical location (e.g., playing area, or court). Any image capture devices can be connected in a wired or wireless manner to any of the computing systems as further disclosed herein.

Figure 2:
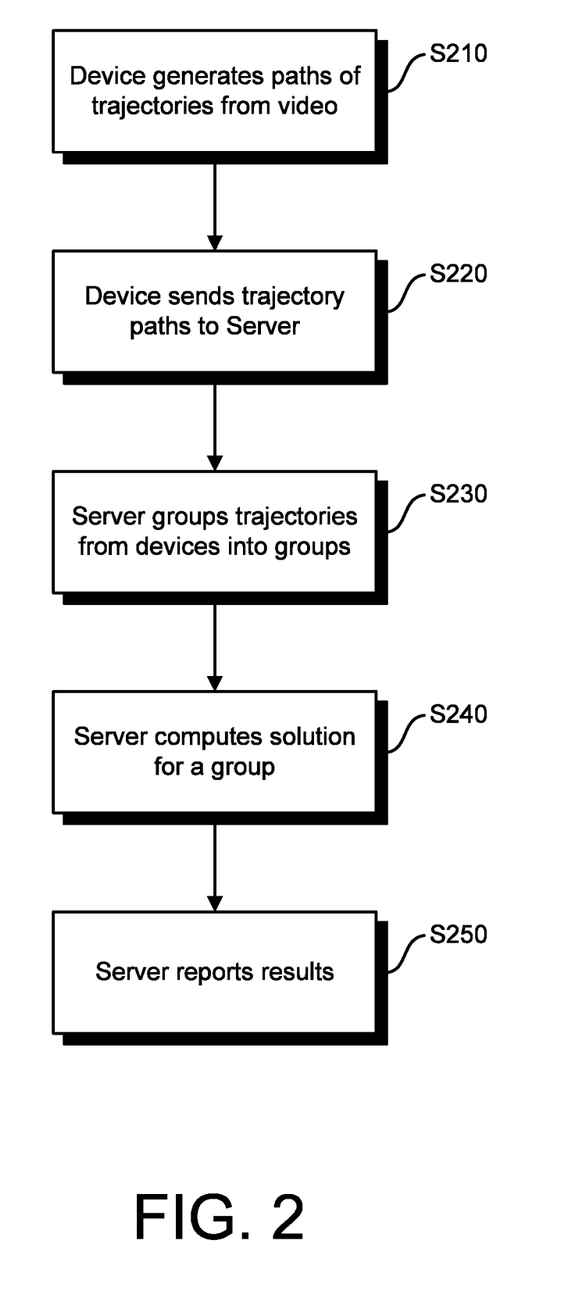
FIG. 2 is a flowchart of an exemplary 3D trajectory reconstruction process consistent with implementations of the current subject matter.

As shown in FIG. 2, the 3D projectile object trajectory reconstruction process may be performed in a plurality of steps in accordance with an example implementation. For example, at least one image capture device, such as a mobile phone, generates paths of trajectories from a video captured using the image capture device of the at least one device (S210). A mobile phone may capture a video of multiple projectile objects, such as tennis balls, and generate a path for one projectile object of interest. If multiple image capture devices are used, the devices may or may not need to be synchronized depending on implementations.

In certain embodiments, at least one device (e.g., computing system 110) sends the generated paths of trajectories to a server (S220). The server (e.g., computing system 120) may be any suitable server, such as a cloud server, a remote server, etc. If more than one device is used, the server groups the generated paths of trajectories from one or more devices into distinct groups by time (S230). A group may include the trajectory path from a device, and one or more groups may include the actual trajectory of the projectile. The server may compute a solution for the content of one or more groups to determine a trajectory path (S240). Finally, the server reports the resulting solutions or paths to a host server or device (S250).

Figure 3:
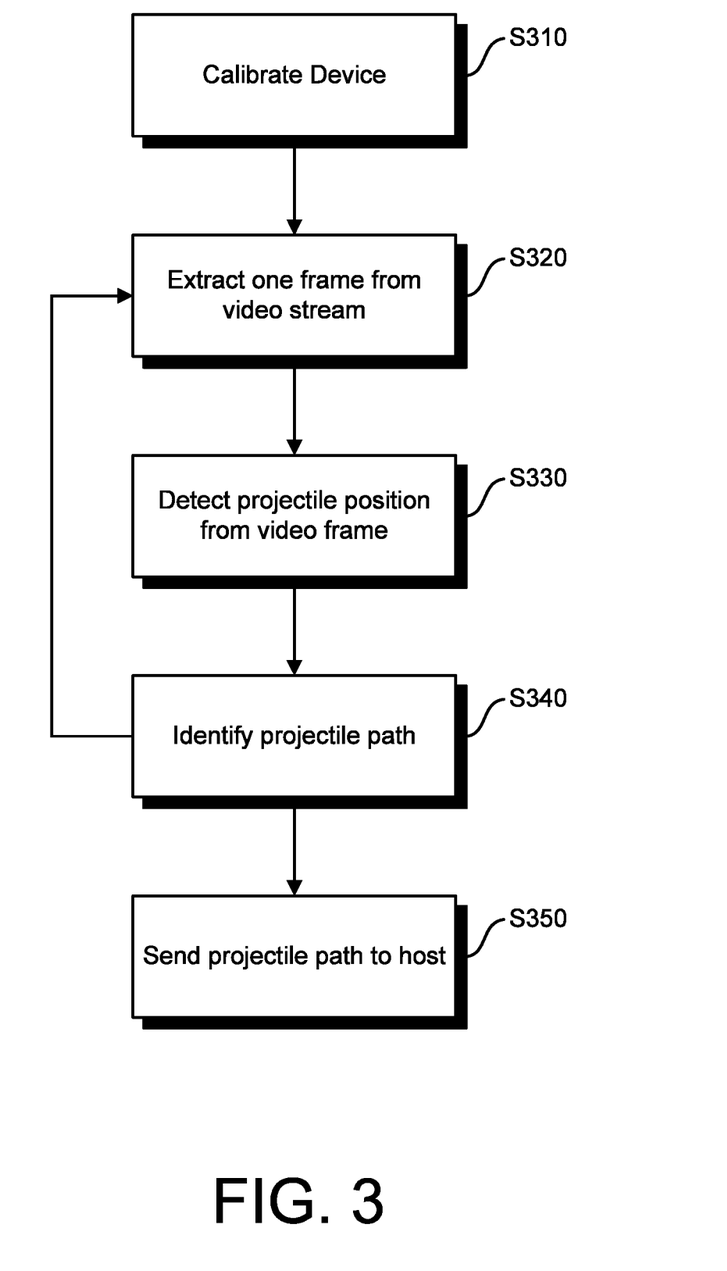
FIG. 3 is a flowchart of exemplary steps 1 and 2 of the 3D trajectory reconstruction process of FIG. 2.

FIG. 3 gives additional information regarding the trajectory detection and transmission processes of FIG. 1. At least one image capture device, e.g. a mobile phone, may be utilized to execute the process illustrated in FIG. 3. The device may be calibrated to the field of view it will use to capture video of the projectile object(s) (S310). The image capture device then continually examines one or more frames of the captured video to detect a path of a projectile object of interest. The path may be defined by a set of x and y coordinates and the time occurrence of the video as recorded by the image capture device.

As used herein, the term "calibration" is used to refer to the process of determining specific parameters including, for example, focal length, optical center, relative position and orientation, etc. These parameters may be used to triangulate and reconstruct a three dimensional object using two dimensional coordinates. For example, reconstructing a three dimensional object's trajectory may use a trajectory in a group along with calibration parameters of an image capture device associated with the group, to perform the reconstruction. In another example, such as for use in a tennis setting, calibration may refer to the use of defined parameters such as tennis court lines as reference parameters to establish the three dimensional space (e.g., the x, y, and z planes) in which the three dimensional object trajectory is spatially located.

In certain embodiments, at least one frame from the video stream is extracted (S320). The projectile object position is detected from the extracted video frame (S330). A projectile trajectory path is identified (S340). The extraction, detection, and identification processes may be repeated until a full projectile trajectory path is identified. The calculated projectile trajectory may be sent to the host server or device (S350). The output from the trajectory detection is a set of paths. These paths may be sent to a host server or device (e.g., using one or more of centralized, distributed, or edge computing platforms) for further processing to obtain the 3D projectile trajectory.

Figure 4:
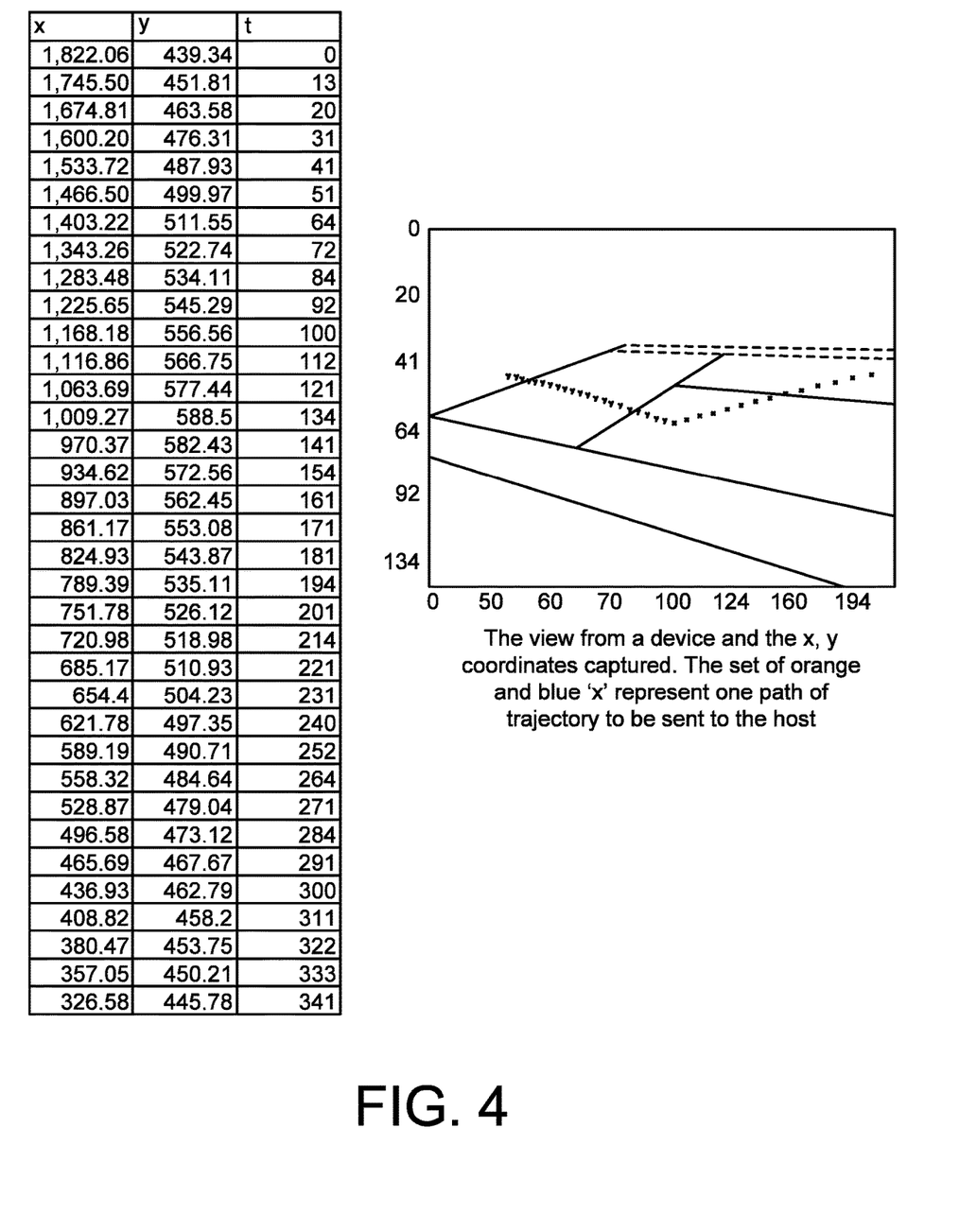
FIG. 4 shows an example data output from a single device using the 3D trajectory reconstruction process in accordance with one or more embodiments.

Referring to FIGS. 4A and 4B, example data outputs from an image capture and processing device are provided. As shown in FIG. 4A, a data table including x and y coordinates and time stamps may be used to generate a trajectory path as shown in FIG. 4B. The dotted trajectory path shown in FIG. 4B represents one path of trajectory to be sent to the host server or device.

Figure 5:
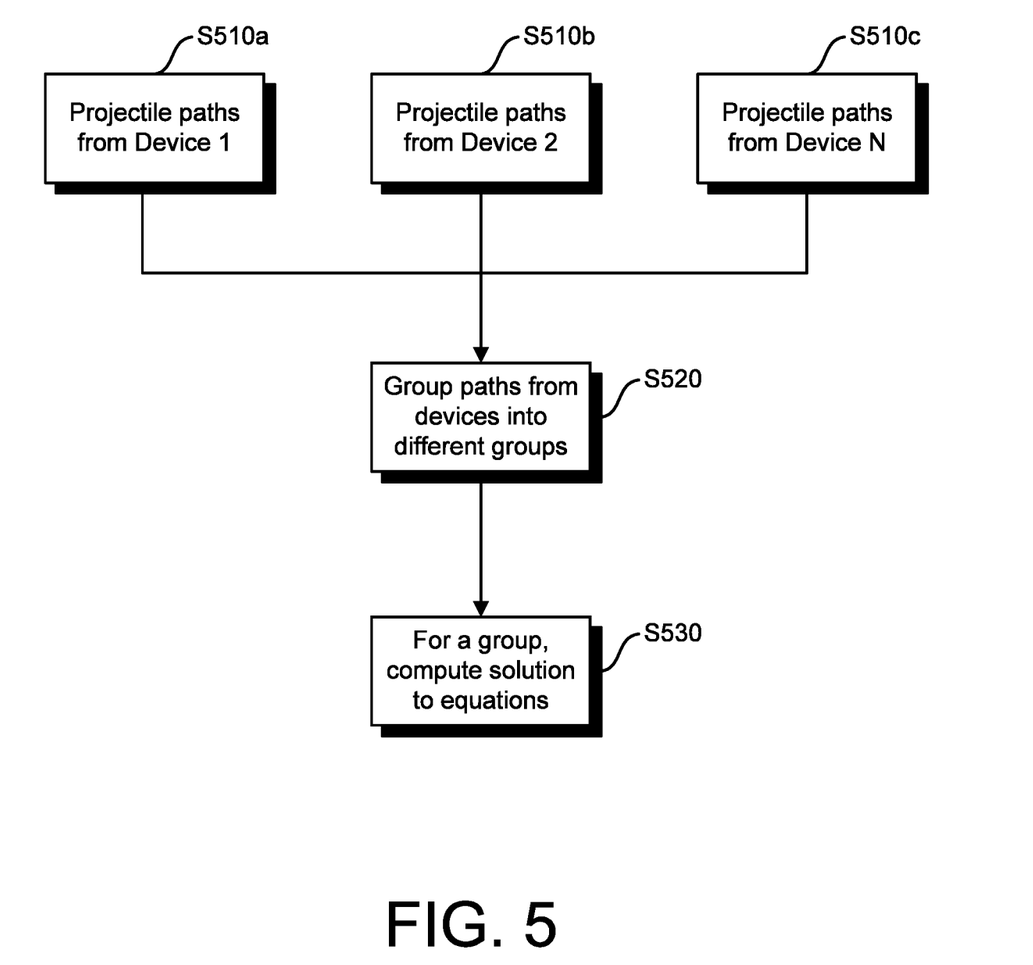
FIG. 5 is a flowchart of an exemplary step 3 of the 3D trajectory reconstruction process of FIG. 1, combining data from multiple devices.

FIG. 5 gives additional information regarding the grouping of trajectories as depicted in FIG. 2. Projectile trajectory paths are obtained from multiple image capture devices and sent to the host server or device for continuous combined processing (S510a to S510c). The paths from a plurality of devices may be grouped into groups, a group containing a projectile trajectory path from an image capture device (S520). For a group, a solution to equations is computed to generate multiple projectile trajectories (S530), which correlate to the actual projectile trajectory at the time of image capture.

Figure 6:
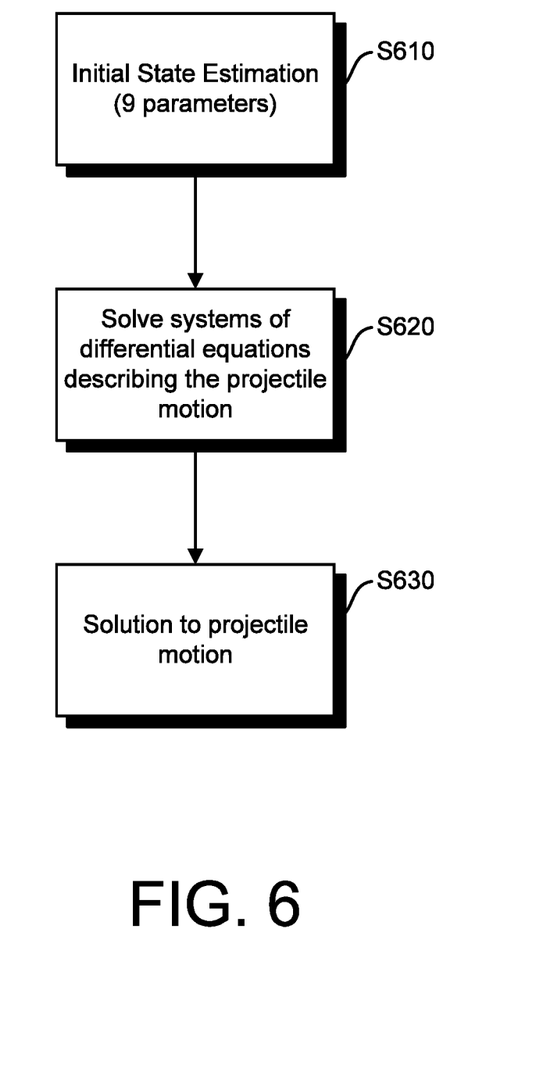
FIG. 6 is a flowchart of an exemplary step 4 of the 3D trajectory reconstruction process of FIG. 2 for processing the reconstruction of the trajectory.

FIG. 6 gives additional information regarding the reconstruction process of FIG. 2 involving computing a solution for one or more groups. In one embodiment, an initial condition is estimated using nine physical parameters: location (x, y, and z planes), velocity (x, y, and z planes), and spin (x, y, and z planes) (S610). A projectile trajectory model, as disclosed herein and in Appendix A, may be used to solve a system of differential equations describing projectile flight (S620). For example, the differential equations may describe the motion of a projectile object (e.g. a sports ball such as a tennis ball). The loss function, e.g. the distance between data points, may also be calculated, and re-evaluated using new parameters until a minimum loss function is reached. The smaller the distance, the more likely the generated trajectory is the true trajectory. Accordingly, a solution to the projectile motion may be achieved (S630). When more image capture devices are used to generate data, the loss function will be decreased as the solution will be closer to the true trajectory. This solution represents the projectile trajectory with the best match for the data points at a point in time.

Figure 7:
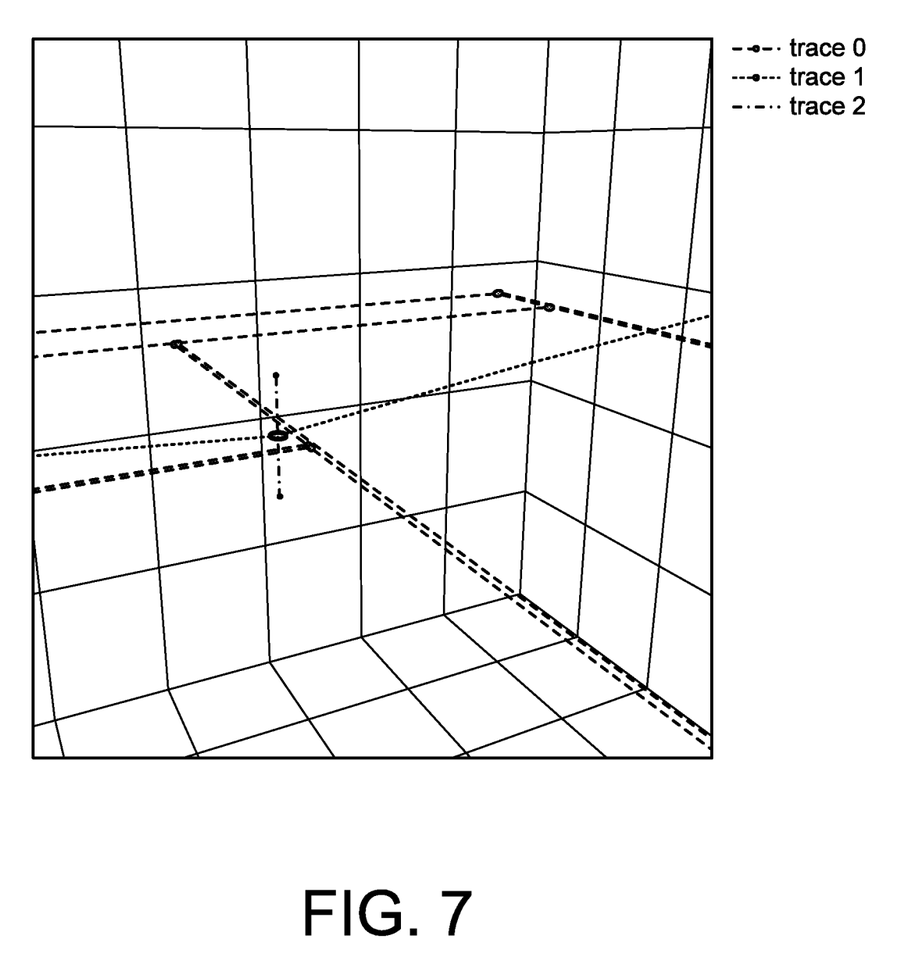
FIG. 7 is an example graphical representation of a 3D reconstruction of a projectile trajectory.

FIG. 7 shows a graphical representation of an example 3D projectile trajectory generated according to the projectile trajectory modeling process disclosed above. It is noteworthy that example embodiments of the disclosed projectile trajectory model and the related modeling process may be implemented in accordance with the details provided in Appendix A attached hereto. The contents of Appendix A are part of this disclosure and are incorporated herein in their entirety and without limitation. As shown in FIG. 7, trace 0 represents the boundaries of the field of motion pertinent to the projectile. Trace 1 represents the projectile trajectory. Trace 2 represents the location of the projectile in the z-axis of the projectile trajectory.

In an embodiment, the model and 3D projectile trajectory reconstruction may be used to determine the location of a tennis ball during game play. For example, it may be desirable to determine whether the ball was in or out, e.g. still in play, at a certain point in time. One or more stationary and image capture devices, such as mobile phones, may be used to capture video of one or more active tennis matches, wherein the one or more image capture devices may not be synchronized to the same universal clock. If the tennis ball is hit out of the court and is no longer in play, the image capture devices may send the videos they captured to a server or to a host device, in order to generate a 3D projectile trajectory for the tennis ball that may be out of the court and no longer in play. This 3D projectile trajectory may be analyzed to determine if the ball was in fact out of the court at the time in question. For example, FIG. 7 shows an example graphical output, wherein trace 0 represents the tennis court, trace 1 represents the tennis ball's trajectory, and trace 2 represents the z-axis location of the tennis ball along its trajectory.

As used herein, the description of many features are made in relation to the game of tennis. Such an example implementation is not intended to be limiting. For example, the features described herein can be applied to any suitable game or activity, for example, football, hockey, baseball, basketball, track and field sports, soccer, or the like. Also, while the type of object most commonly tracked is a ball, this too is not limiting. For example, a person, a vehicle, or any moving object or projectile can be tracked in a similar manner, whether in the context of a sport activity or not.

Figure 8:
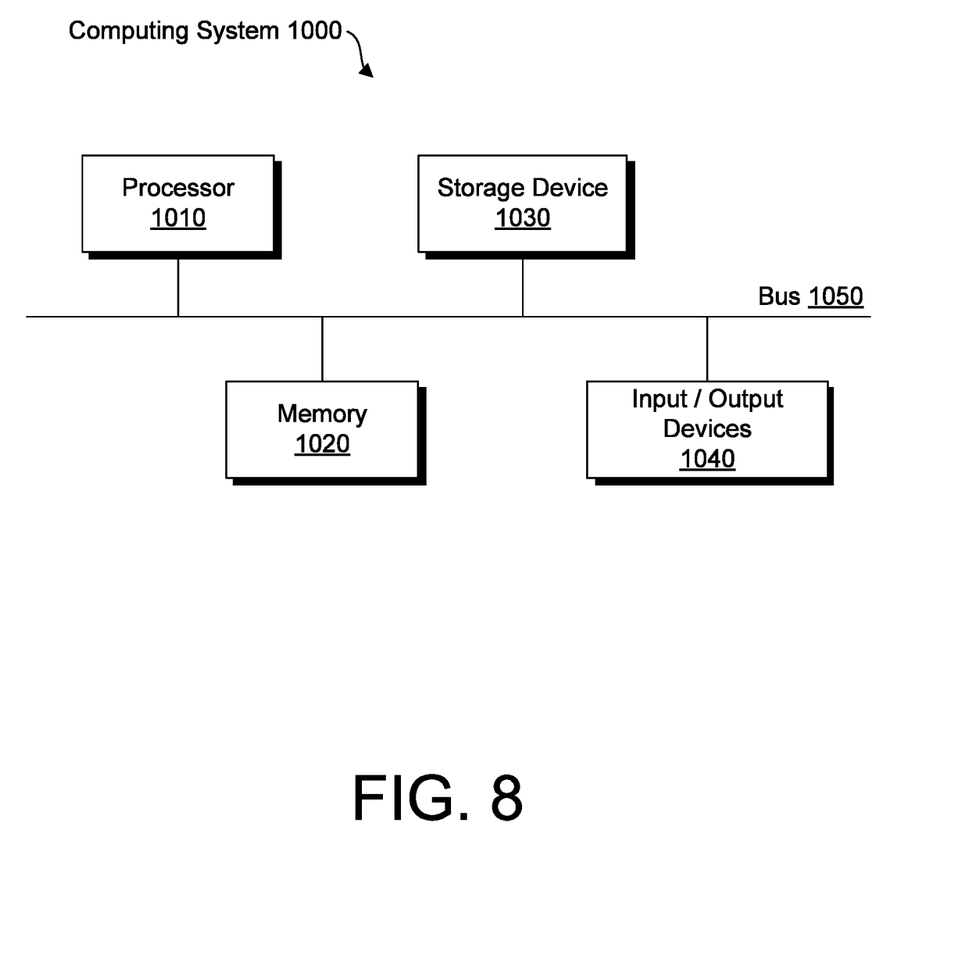
FIG. 8 is a block diagram of an example computing system that may be utilized to perform one or more computing operations or processes as consistent with one or more disclosed features.

Referring to FIG. 8, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 8, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet, mobile data networks, etc.).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

COPYRIGHT & TRADEMARK NOTICES

A portion of the disclosure of this patent document may contain material, which is subject to copyright protection. The applicant has no objection to the reproduction of the patent documents or the patent disclosure as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method for reconstructing a three-dimensional projectile object trajectory for a projectile object using one or more image capture devices, the method comprising:
capturing one or more videos of a projectile object trajectory for the projectile object, using the one or more image capture devices coupled to at least a first computing device, the first computing device communicatively connected to a second computing device over a communications network;
transmitting the one or more videos to the second computing device over the communications network, wherein the one or more videos from the one or more image capture devices are sorted into one or more data groups and at least one solution for the one or more data groups is computed by the second computing device using a projectile trajectory model; and
receiving the solution computed for the one or more data groups by the first computing device,
wherein the projectile trajectory model is implemented according to a function ($\Theta$,t) that returns three-dimensional coordinates of the projectile object at time t governed by the projectile trajectory model with an initial state $\Theta$,
wherein the initial state $\Theta$ is a tuple (x, y, z, vx, vy, vy, wx, wy, wz) which denotes the coordinates, velocity and spin of the projectile object in a three-dimensional environment, and
wherein a loss function $f$ of the projectile trajectory model is defined by the function ($\Theta$,t) as:

$$\min_{\theta,\tau} \sum_i \sum_j d(P_i \cdot f(\theta, t_{ij} + \tau_i), x_{ij}^t)$$

wherein $x_{ij}^t$ denotes a sample trajectory object J observed by at least one of the one or more image capture devices i at time t and Pi is the projection matrix for the capture device i and τi represents the time lag of the capture device i, and the function d measures distances between two homogeneous points on the capture device i frame.

2. The method of claim 1, wherein capturing a greater number of videos of the projectile object trajectory results in calculating a more accurate solution.

3. The method of claim 1, wherein the three-dimensional projectile object trajectory includes one or more of: a path of the projectile object, a derived speed of the projectile object, a position of the projectile object, or the spin of the projectile object.

4. The method of claim 1, wherein the capturing of the one or more videos of the projectile object trajectory further includes isolating a single projectile object of interest from a field of view including two or more projectile objects.

5. The method of claim 4, wherein the function d returns a Euclidean distance between the two homogeneous points.

6. The method of claim 5, wherein the function ($\Theta$,t) is used to calculate coordinates of the projectile object y(t) at time t with the initial state $\Theta$ by solving the following system of differential equations:

$$F_{drag} = -\frac{1}{2} C_d A \rho \left|\frac{dy}{dt}\right| \frac{dy}{dt}$$

$$F_{lift} = \frac{1}{2} L_e A \rho r \left|\frac{dy}{dt}\right| |\omega| \frac{\frac{dy}{dt} \times \omega}{\left|\frac{dy}{dt} \times \omega\right|}$$

$$T_{aero} = -T_e r |F_{lift}| \frac{\omega}{|\omega|}$$

$$I = \frac{2}{3} m r^2$$

$$\frac{d^2 y}{dt^2} = \frac{F_{lift}}{m} + \frac{F_{drag}}{m} + \frac{g}{m}$$

$$\frac{d\omega}{dt} = \frac{T_{aero}}{I}$$

where:
$C_d$=Drag coefficient
$L_e$=Lift coefficient
$T_c$=Aerodynamic torque
$\rho$=Air density
A=Projectile cross section area
r=Radius of ball projectile
m=Mass of ball projectile
g=gravity acceleration.

7. A computing device comprising:
an image capture device communicatively coupled to a programmable processor;
a non-transient machine-readable medium storing instructions that, when executed by the programmable processor, cause the programmable processor to perform operations comprising:
capturing, using the image capture device, one or more two-dimensional videos of a three-dimensional projectile object;
calculating a data group based on the one or more two-dimensional videos;
computing, using the programmable processor, a solution that is based on the data group, the solution corresponding to at least one characteristic of the three-dimensional projectile object; and
displaying a visual representation of the three-dimensional projectile object and at least one trajectory for the projectile object based on the solution,
wherein the projectile trajectory model is implemented according to a function ($\Theta$,t) that returns three-dimensional coordinates of the projectile object at time t governed by the projectile trajectory model with an initial state $\Theta$,
wherein the initial state $\Theta$ is a tuple (x, y, z, vx, vy, vy, wx, wy, wz) which denotes the coordinates, velocity and spin of the projectile object in a three-dimensional environment, and
wherein a loss function $f$ of the projectile trajectory model is defined by the function ($\Theta$,t) as:

$$\min_{\theta,\tau} \sum_i \sum_j d(P_i \cdot f(\theta, t_{ij} + \tau_i), x_{ij}^t)$$

wherein $x_{ij}^t$ denotes a sample trajectory object J observed by at least one of the one or more image capture devices i at time t and Pi is the projection matrix for the capture device i and ti represents the time lag of the capture device i, and the function d measures distances between two homogeneous points on the capture device iframe.

8. The computing device of claim 7, wherein the capturing one or more two-dimensional videos of the three-dimensional projectile object further includes isolating a single projectile object of interest from a field of view including two or more projectile objects.

9. The computing device of claim 7, wherein the solution includes one or more of: a path of the projectile object, a derived speed of the projectile object, a position of the projectile object, or the spin of the projectile object.

10. A computer program product comprising a non-transitory, machine-readable medium storing instructions which, when executed by at least one programmable processor, cause the at least one programmable processor to perform operations comprising:

capturing one or more videos of a projectile object trajectory for a projectile object, using one or more image capture devices coupled to at least a first computing device, the first computing device communicatively connected to a second computing device over a communications network;

transmitting the one or more videos to the second computing device over the communications network, wherein the one or more videos from the one or more image capture devices are sorted into one or more data groups, at least one solution for the one or more data groups being calculated using a projectile trajectory model; and receiving the solution computed for the one or more data groups, wherein the projectile trajectory model is implemented according to a function $(\ominus,t)$ that returns three-dimensional coordinates of the projectile object at time t governed by the projectile trajectory model with an initial state $\ominus$, wherein the initial state $\ominus$ is a tuple (x, y, z, vx, vy, vy, wx, wy, wz) which denotes the coordinates, velocity and spin of the projectile object in a three-dimensional environment, and wherein a loss function $f$ of the projectile trajectory model is defined by the function $(\ominus,t)$ as:

$$\min_{\theta,\tau} \sum_i \sum_j d(P_i \cdot f(\theta, t_{ij} + \tau_i), x_{ij}^t)$$

wherein $x_{ij}^t$ denotes a sample trajectory object J observed by at least one of the one or more image capture devices i at time t and Pi is the projection matrix for the capture device i and τi represents the time lag of the capture device i, and the function d measures distances between two homogeneous points on the capture device i frame.

11. The computer program product of claim 10, wherein the one or more image capture devices comprise one or more cameras or video recorders that are not synchronized to a universal clock and the first computing device comprises a smartphone that includes the image capture device.

12. The computer program product of claim 10, wherein the solution includes one or more of: a path of the projectile object, a derived speed of the projectile object, a position of the projectile object, or the spin of the projectile object.

13. A computer-implemented method of reconstructing a three-dimensional projectile object trajectory, the method comprising:

receiving, at a remote computing device, one or more videos of a projectile object trajectory for a projectile object, the one or more videos being captured using one or more image capture devices coupled to a local computing device, the local computing device and the remote computing device being communicatively connected over a communications network;

sorting the one or more videos from the one or more image capture devices into one or more data groups;

computing at least one solution for the one or more data groups using a projectile trajectory model; and transmitting the solution computed for the one or more data groups to the local computing device over the communications network, wherein the projectile trajectory model is implemented according to a function $(\ominus,t)$ that returns three-dimensional coordinates of the projectile object at time t governed by the projectile trajectory model with an initial state $\ominus$, wherein the initial state $\ominus$ is a tuple (x, y, z, vx, vy, vy, wx, wy, wz) which denotes the coordinates, velocity and spin of the projectile object in a three-dimensional environment, and wherein a loss function $f$ of the projectile trajectory model is defined by the function $(\ominus,t)$ as:

$$\min_{\theta,\tau} \sum_i \sum_j d(P_i \cdot f(\theta, t_{ij} + \tau_i), x_{ij}^t)$$

wherein $x_{ij}^t$ denotes a sample trajectory object J observed by at least one of the one or more image capture devices i at time t and Pi is the projection matrix for the capture device i and τi represents the time lag of the capture device i, and the function d measures distances between two homogeneous points on the capture device i frame.

14. The method of claim 13, wherein the one or more image capture devices comprise one or more cameras or video recorders that are not synchronized with a universal clock.

15. The method of claim 13, wherein the three-dimensional projectile object trajectory includes one or more of: a path of the projectile object, a derived speed of the projectile object, a position of the projectile object, or the spin of the projectile object.

* * * * *